Aug. 19, 1924.
J. G. HANSEN
HARROW
Filed Oct. 21, 1922      2 Sheets-Sheet 2
1,505,196
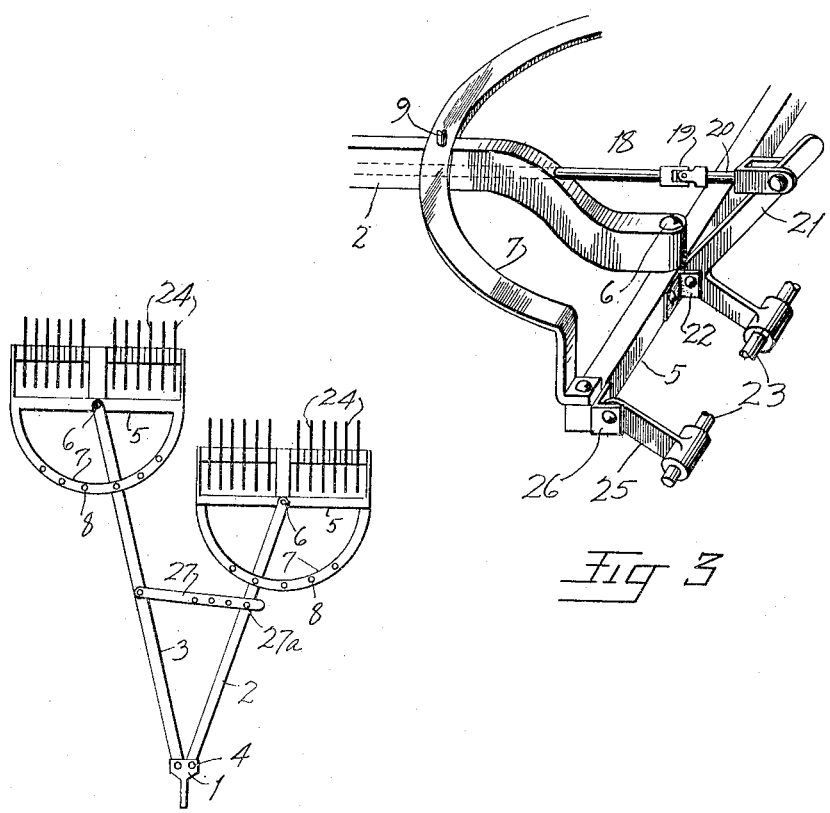
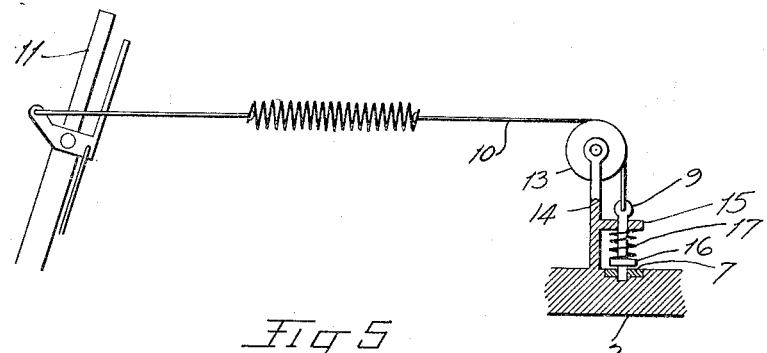

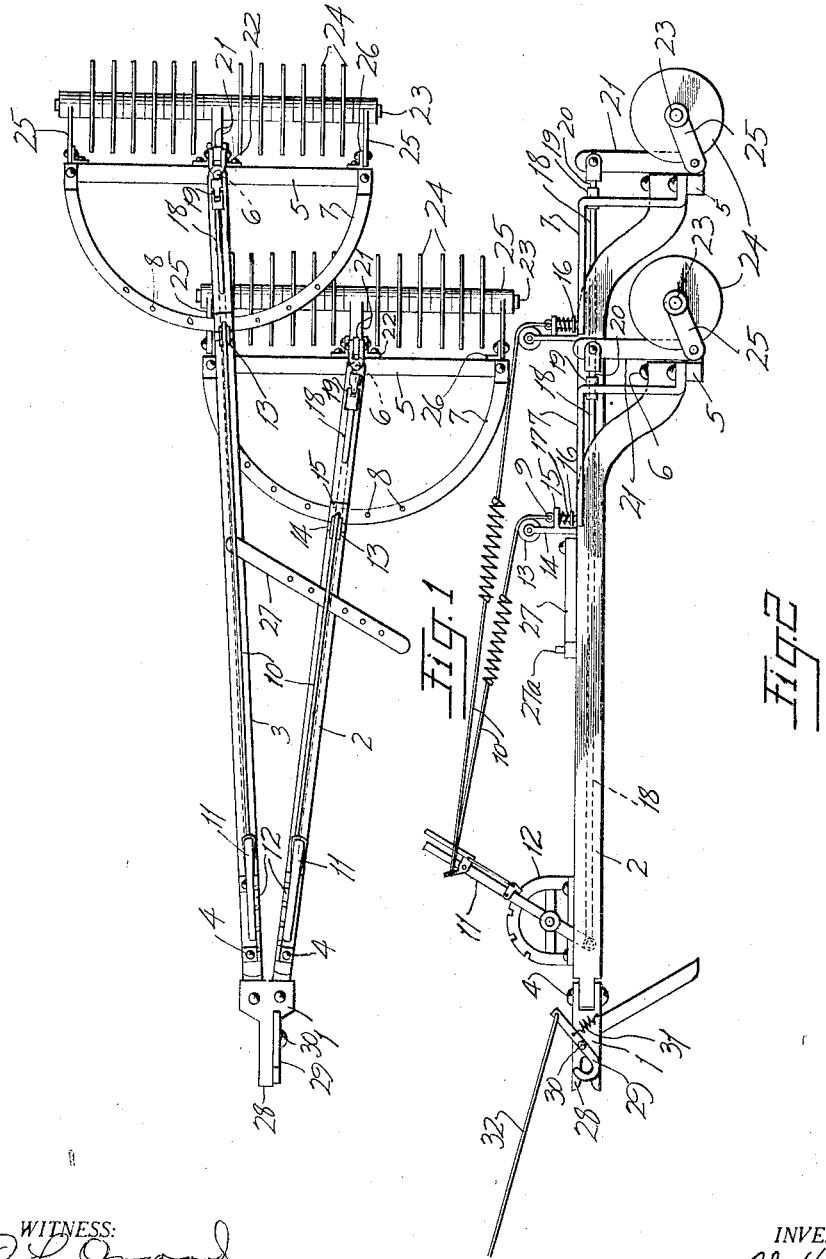

Patented Aug. 19, 1924.

1,505,196

UNITED STATES PATENT OFFICE.

JOHN G. HANSEN, OF CEDAR FALLS, IOWA.

HARROW.

Application filed October 21, 1922. Serial No. 596,068.

*To all whom it may concern:*

Be it known that I, JOHN G. HANSEN, a citizen of the United States, residing at Cedar Falls, in the county of Black Hawk and State of Iowa, have invented certain new and useful Improvements in Harrows, of which the following is a specification.

This invention relates to improvements in harrows and more particularly to that type of harrow usually used in sets of two or more and one object is to provide such a harrow wherein the two units of the set may be adjusted relatively by spreading them apart or bringing them together, or either unit may be adjusted to dispose its blades at an angle to the line of draft, or may be raised or lowered with respect to the ground line. Means for instantly detaching the machine from the tractor or draft animals are also provided.

With the foregoing and other objects in view the invention consists in the combination and arrangement of parts to be hereinafter fully described, pointed out in the appended claims and illustrated in the accompanying drawings which form a part of this application and in which—

Fig. 1 is a plan view of the machine, the units being drawn close together.

Fig. 2 is a view of the same in side elevation.

Fig. 3 is an enlarged fragmentary view illustrating a portion of the adjusting mechanism.

Fig. 4 is a diagrammatic view showing the units spread apart.

Fig. 5 is a sectional detail view illustrating a sector-release pin and connections employed.

Like reference characters denote corresponding parts throughout the several views.

The reference numeral 1 denotes the draft plate to which the short and long frame-bars 2 and 3 are connected by the pivot bolts 4, the non-pivoted end of each frame bar being bent downwardly and having a cross bar 5 secured thereto by a bolt 6, the ends of said bar 5 having bolted thereto the downturned ends of a segment 7 which slidably engages with a notched portion of a frame-bar 2 or 3, said segment being formed with perforations 8 any one of which is adapted to align with a recess in the frame-bar, as the segment is adjusted, to receive a latch-pin 9 whereby said segment is retained in adjusted position upon the frame-bar.

Each latch-pin 9 is engaged by a flexible element 10 connected to a hand lever 11 working over a rack 12, a rack 12 being carried by each frame-bar. The said flexible element 10 passes over a sheave 13 carried by a standard 14, arranged upon each frame-bar, said latch-pin 9 passing through a perforation in an extension 15 of said standard and being provided with a collar 16 between which and the said extension an expansion coil spring 17 is arranged upon the latch pin, said spring serving to yieldingly retain said latch pin in a predetermined position connecting said segment and frame-bar. By moving the lever 11 toward the pivoted end of the frame-bar the latch pin 9 is withdrawn or retracted and relative movement of the frame-bar and segment made possible.

Each lever 11 extends into a recessed portion of its frame-bar and engages and actuates a reach bar 18 which extends through the recessed frame-bar and is connected by the universal coupling 19 to the link 20 that is connected to the bell-crank-lever 21 fulcrumed to an angle iron 22 carried by the cross bar 5, said bell-crank-lever engaging and supporting the shaft 23 whereon the discs or blades 24 are arranged, the ends of said shaft being carried by the links 25 pivotally supported by the angle pieces 26 arranged at the ends of the cross rod 5.

To swing one set of blades 24 at an angle to the line of draft the operator moves one lever 11 forward, or toward the draft plate 1, thus lifting the latch pin 9. He may then move the frame-bar, through the operation of his tractor, laterally and independently of the segment 7 until the desired adjustment is attained. He then returns the lever 11 and replaces the pin 9 and the new adjustment is made. The forward movement of the lever 11 depresses the shaft 23 and blades 24 and insures easy relative movement of the frame-bar. Only one, or both units, may be adjusted at the same time. A perforate reach bar 27 adjustably connects the frame-bars 2, 3, releasably, to normally retain them in adjusted positions. This bar is disconnected from one of the frame-bars when only one bar is to be swung relative to its segment for adjustment. A pin 27ª passing through the perforated portions of said bar connects it to the perforate portions of the frame bar.

To the draft plate 1, which plate is formed with a bifurcation 28, a hook bar 29 is pivotally secured by a bolt 30, the hooked end of said bar serving, in cooperation with the bifurcated end 28 of the draft plate to retain the draft pin (not shown) in operative position in said plate when said hook bar is in normal position as shown in Fig. 2, said hook being yieldingly retained in normal position by a spring 31 connecting it to the plate 1. A bar 32 connects one end of the hook bar 29 and an operating lever (not shown) whereby said hook bar may be moved out of operative association with the bifurcated end of the plate 1 to permit withdrawal of the draft pin to release the plate and harrow from the tractor or draft animals.

What is claimed is:—

1. In a harrow, a draft plate, recessed frame-bars pivotally connected thereto, one of said bars being longer than the other, cross bars carried by said frame-bars, segments adjustably connecting said frame-bars and connected to said cross bars, bell-crank-levers fulcrumed to said cross bars, harrow blades carried by said bell-crank-levers, hand levers fulcrumed upon said frame-bars and extending into the recessed portions thereof, reach bars disposed in the recesses in said frame-bars and operatively connecting said hand levers and bell-crank-levers, means connecting said hand levers and segments for disconnecting the latter and said frame-bars, and a reach bar connecting said frame-bars.

2. In a harrow, a draft plate, frame-bars pivotally connected thereto, one of said bars being longer than the other, cross bars carried by said frame-bars, segments adjustably connecting said frame-bars and normally pin-connected to said cross bars, harrow blades carried by said cross bars, means for simultaneously adjusting said harrow blades and withdrawing the pins from said segments, and a reach bar adjustably connecting said frame-bars.

In testimony that I claim the foregoing as my own I have hereto affixed my signature in the presence of two subscribing witnesses.

JOHN G. HANSEN.

Witnesses:
JENS L. KRISTENSEN,
ALBERT G. HANSEN.